US 11,053,953 B2

(12) United States Patent
Pope (10) Patent No.: US 11,053,953 B2
(45) Date of Patent: Jul. 6, 2021

(54) STRUCTURAL GUIDE VANE (71) Applicant: United Technologies Corporation, Farmington, CT (US)

(72) Inventor: Andrew Pope, Glendale, NY (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 129 days.

(21) Appl. No.: 15/886,121

(22) Filed: Feb. 1, 2018

(65) Prior Publication Data

US 2019/0234424 A1    Aug. 1, 2019

(51) Int. Cl.
| F01D 5/14 | (2006.01) |
| B32B 15/04 | (2006.01) |
| F04D 29/54 | (2006.01) |
| F02K 3/06 | (2006.01) |
| B32B 15/14 | (2006.01) |
| F01D 9/04 | (2006.01) |

(52) U.S. Cl.
CPC .......... *F04D 29/542* (2013.01); *B32B 15/043* (2013.01); *B32B 15/14* (2013.01); *F01D 9/041* (2013.01); *F02K 3/06* (2013.01); *B32B 2603/00* (2013.01); *F05D 2220/32* (2013.01); *F05D 2230/10* (2013.01); *F05D 2230/31* (2013.01); *F05D 2240/12* (2013.01); *F05D 2300/173* (2013.01); *F05D 2300/174* (2013.01); *F05D 2300/603* (2013.01)

(58) Field of Classification Search
CPC ........ F01D 5/147; F01D 5/282; F04D 29/324; F04D 29/388; F04D 29/24; F04D 29/30; B32B 2603/00
See application file for complete search history.

(56) References Cited

U.S. PATENT DOCUMENTS

| 2,477,375 A * | 7/1949 | Jablonsky .......... B29D 99/0028 156/222 |
| 4,108,572 A | 8/1978 | Platt |
| 5,141,400 A * | 8/1992 | Murphy ................. B29C 43/18 416/204 A |
| 5,269,058 A * | 12/1993 | Wiggs .................. B21D 26/055 228/157 |
| 5,672,417 A * | 9/1997 | Champenois ........... F01D 5/282 442/208 |
| 8,011,882 B2 * | 9/2011 | McMillan ............... F01D 5/147 415/148 |
| 8,794,884 B2 | 8/2014 | Gaudette |
| 9,121,284 B2 | 9/2015 | Pope |

(Continued)

FOREIGN PATENT DOCUMENTS

| EP | 3232006 A1 | 10/2017 |
| WO | 2015073852 A1 | 5/2015 |

OTHER PUBLICATIONS

Tamer Sinmazcelik, Fiber metal laminates, backgrouds, bonding types and applied methods, pp. 3671-3685 (Year: 2011).*

(Continued)

Primary Examiner — Woody A Lee, Jr.
Assistant Examiner — Maxime M Adjagbe
(74) Attorney, Agent, or Firm — Cantor Colburn LLP (57) ABSTRACT A structural guide vane including a vane body contact surface and a vane edge, wherein at least one of the vane body contact surface or the vane edge comprises a fiber metal laminate.

20 Claims, 8 Drawing Sheets (56) References Cited

U.S. PATENT DOCUMENTS

| | | |
|---|---|---|
| 2005/0081965 A1* | 4/2005 | Benedictus ............. C22C 21/16 |
| | | 148/552 |
| 2013/0129494 A1 | 5/2013 | Duchaine et al. |
| 2014/0311149 A1* | 10/2014 | Chuang ................. F04D 29/384 |
| | | 60/726 |
| 2016/0152005 A1 | 6/2016 | Roach et al. |
| 2017/0292530 A1 | 10/2017 | Pope |

OTHER PUBLICATIONS

European Search Report for European Application No. 19154314.9 dated Jun. 18, 2019, 6 pages.
European Search Report for European Application No. 19154314.9; Application Filing Date: Jan. 29, 2019; Dated Dec. 14, 2020; 4 pages.

\* cited by examiner

STRUCTURAL GUIDE VANE

BACKGROUND

Exemplary embodiments pertain to the art of structural guide vanes. The bypass air flow from a turbine engine fan blade passes through structural guide vanes before exiting the nacelle of the engine. This structural guide vanes are subjected to various static and vibrational stresses. In addition, the structural guide vanes are frequently subjected to impact and erosion issues. These factors, coupled with an ongoing desire to reduce engine component weight has motivated the search for new materials for structural guide vanes.

BRIEF DESCRIPTION

Disclosed is a structural guide vane including a vane body contact surface and a vane edge, wherein at least one of the vane body contact surface or the vane edge comprises a fiber metal laminate.

In addition to one or more of the features described above, or as an alternative to any of the foregoing embodiments, the vane body and the vane edge comprise the fiber metal laminate.

In addition to one or more of the features described above, or as an alternative to any of the foregoing embodiments, the vane body and the vane edge are integral.

In addition to one or more of the features described above, or as an alternative to any of the foregoing embodiments, the fiber metal laminate comprises a metal layer comprising at least one of titanium or a titanium alloy.

In addition to one or more of the features described above, or as an alternative to any of the foregoing embodiments, the titanium alloy comprises, by weight, 5.5-6.75 aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium.

In addition to one or more of the features described above, or as an alternative to any of the foregoing embodiments, the fiber metal laminate comprises a carbon fiber layer.

In addition to one or more of the features described above, or as an alternative to any of the foregoing embodiments, the fiber metal laminate comprises a metal layer comprising at least one of aluminum or an aluminum alloy.

In addition to one or more of the features described above, or as an alternative to any of the foregoing embodiments, the aluminum alloy comprises, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc.

In addition to one or more of the features described above, or as an alternative to any of the foregoing embodiments, the aluminum alloy comprises, a maximum of 0.50 percent silicon, 0.50 percent iron, 0.10 percent chromium, 0.25 percent zinc, 0.15 percent titanium, and 3.8-4.9 percent copper, 0.3-0.9 percent manganese, 1.2-1.8 percent magnesium, with the remainder being aluminum.

In addition to one or more of the features described above, or as an alternative to any of the foregoing embodiments, the fiber metal laminate comprises a fiber-reinforced polymer layer.

In addition to one or more of the features described above, or as an alternative to any of the foregoing embodiments, the fiber metal laminate comprises at least one of an aramid fiber or a para-aramid fiber In addition to one or more of the features described above, or as an alternative to any of the foregoing embodiments, the vane edge comprises the fiber metal laminate and the vane body comprises a composite material.

Also disclosed is a method for forming structural guide vane of a gas turbine engine, comprising: providing a raw material comprising a fiber metal laminate; and shaping the raw material into a vane shape.

In addition to one or more of the features described above, or as an alternative to any of the foregoing embodiments, the shaping the raw material comprises machining the raw material.

In addition to one or more of the features described above, or as an alternative to any of the foregoing embodiments, the fiber metal laminate comprises at least one of titanium or a titanium alloy.

In addition to one or more of the features described above, or as an alternative to any of the foregoing embodiments, the fiber metal laminate comprises at least one of aluminum or an aluminum alloy.

Also disclosed is a method for forming structural guide vane of a gas turbine engine, comprising: forming a pressure side half of the airfoil, wherein the pressure side half comprises a fiber metal laminate; forming a suction side half of the airfoil, wherein the suction side half comprises the fiber metal laminate; and coupling the pressure side half to the suction side half.

In addition to one or more of the features described above, or as an alternative to any of the foregoing embodiments, forming the pressure side half comprises: coupling a middle pressure side layer to an outer pressure side layer having an outer pressure side length, the middle pressure side layer comprising a middle pressure side length; and coupling an inner pressure side layer to the middle pressure side layer, the inner pressure side layer comprising an inner pressure side length, wherein the outer pressure side length is larger than the middle pressure side length and the middle pressure side length is larger than the inner pressure side length.

In addition to one or more of the features described above, or as an alternative to any of the foregoing embodiments, forming the suction side half comprises: coupling a middle suction side layer to an outer suction side layer having an outer suction side length, the middle suction side layer comprising a middle suction side length; and coupling an inner suction side layer to the middle suction side layer, the inner suction side layer comprising an inner suction side length, wherein the outer suction side length is larger than the middle suction side length and the middle suction side length is larger than the inner suction side length.

In addition to one or more of the features described above, or as an alternative to any of the foregoing embodiments, at least one of the outer pressure side layer, the middle pressure side layer, or the inner pressure side layer comprises at least one of titanium or a titanium alloy.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
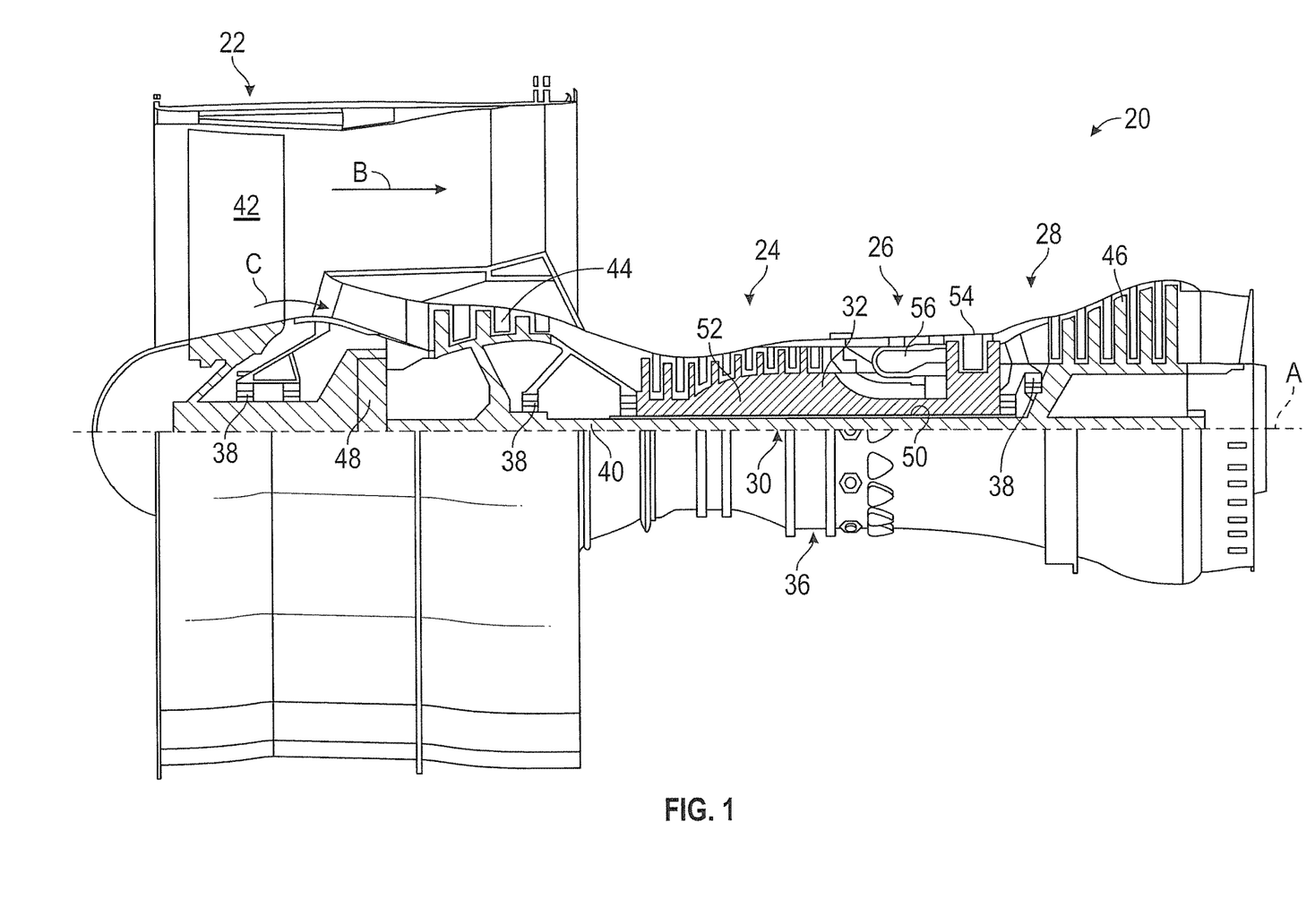
FIG. 1 is cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition-typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]0.5. The "Low corrected fan tip speed" as disclosed herein according to one non-limiting embodiment is less than about 1150 ft/second (350.5 m/sec).

Figure 2:
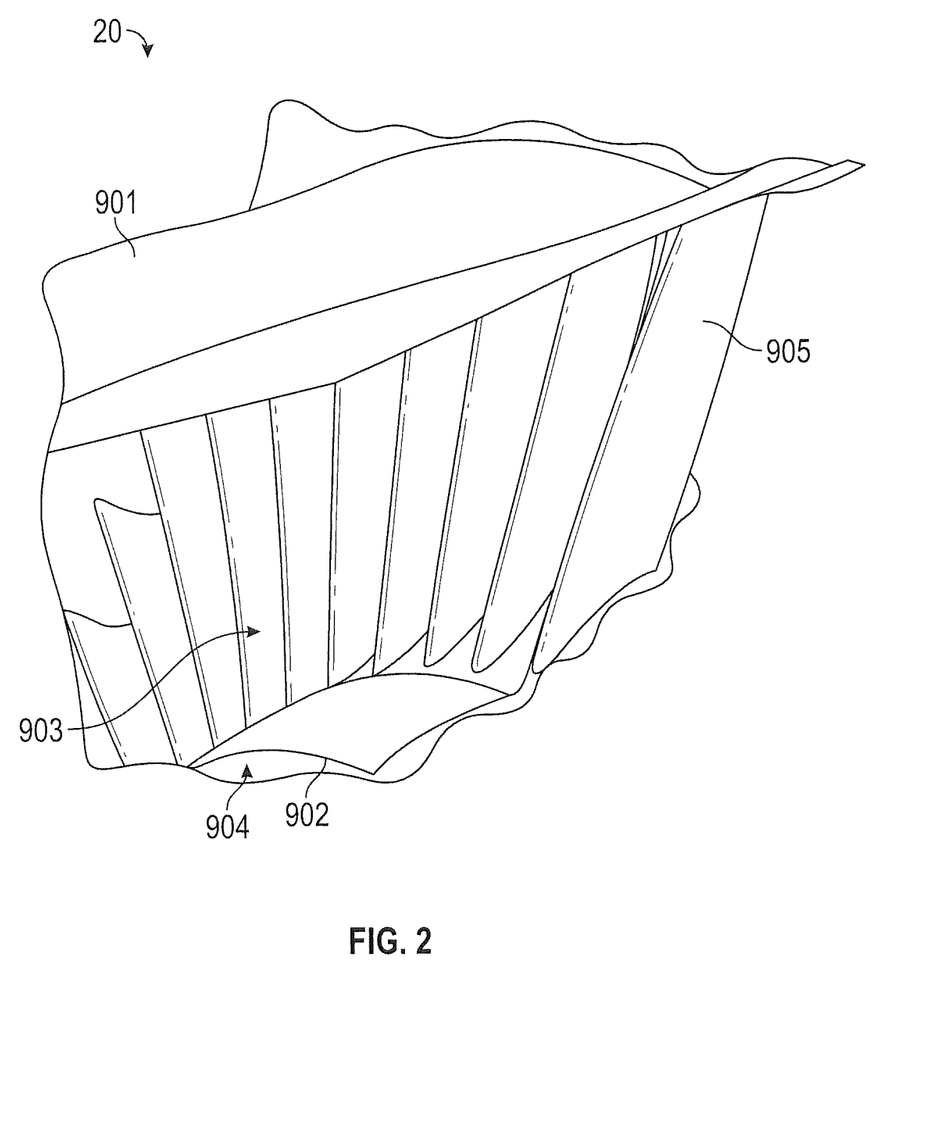
FIG. 2 is a cut-away perspective view of a structural guide vane within a gas turbine engine.

FIG. 2 is a cut-away perspective view of a portion of a gas turbine engine. In FIG. 2, the engine 20 includes a fan case 901 which forms an external surface of the engine 20. Within the fan case 901, a splitter 902 serves to divide engine airflow between an annular outer bypass channel 903 and an annular inner primary engine passage 904 (part of core flow path C). The annular outer bypass channel 903 is bridged by one or more structural guide vanes 905. The one or more structural guide vanes 905 is constructed as described below.

Each vane has a cross-section having an associated camber. Where a plurality of vanes 905 are provided, multiple different vane profiles and associated cambers may be employed. In particular, the resistance of an obstruction, not shown, downstream from the vanes 905 may be mitigated by directing the airflow around the obstruction. This can be accomplished by employing vanes 905 of different vane/camber characteristics depending upon where they are located relative to the obstruction.

Figure 3:
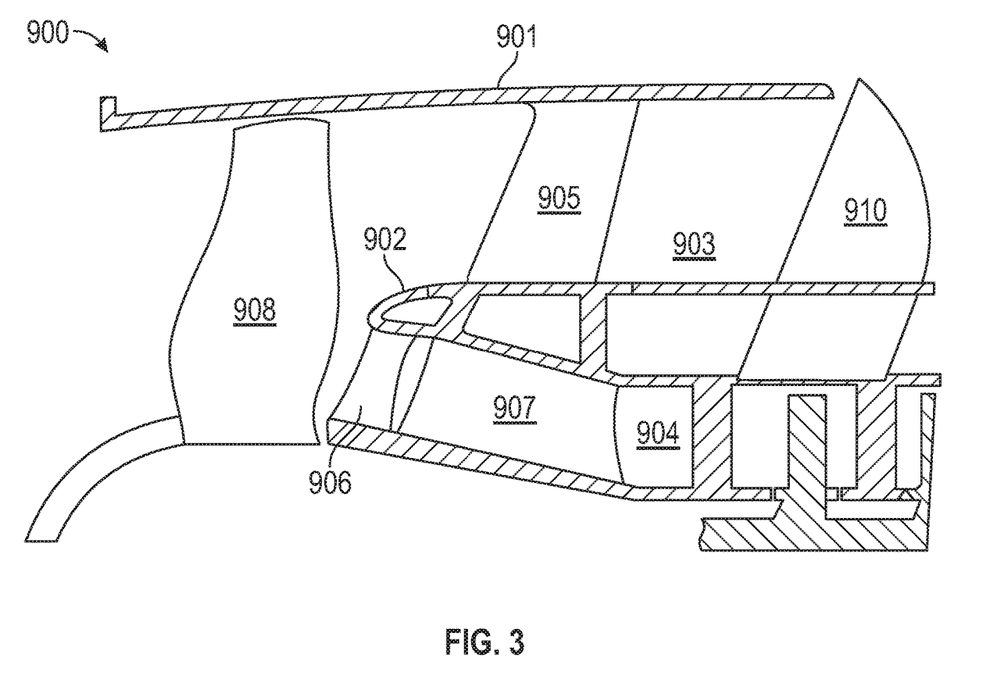
FIG. 3 is a cross-sectional view of a portion of a gas turbine engine.

FIG. 3 is a cross-sectional view of the gas turbine engine 20, showing the noted elements in conjunction with other elements. As noted in reference to FIG. 2, the engine 900 includes a fan case 901 forming an external surface of the engine 900, and a splitter 902 dividing engine airflow between the annular outer bypass channel 903 and the annular inner primary engine passage 904. One of the one or more structural guide vanes 905 is illustrated bridging the annular outer bypass channel 903.

Also visible in the illustration of FIG. 3 is an inlet guide vane 906, which guides air into the annular inner primary engine passage 904. The front center body 907 of the engine 20 is located behind the inlet guide vane 906. A set of fan blades 908 provides intake air to both the annular inner primary engine passage 904 (part of core flow path C) and the annular outer bypass channel 903. An obstruction 910, such as an engine mounting component, is located downstream from the vanes 905.

The structural guide vanes are comprised of a fiber metal laminate ("FML"). An FML is a structural material comprising layers of composite material among layers of metal. Such a structure allows the FML to have the strength properties of the metal comprised in the metal layers, along with the properties associated with the composite material layers, such as corrosion resistance, low density, elasticity, and/or fatigue, among others, that are more advantageous than those properties associated with metals. As used herein, unless stated otherwise, "metal" may refer to an elemental metal and/or a metal alloy.

Figure 4:
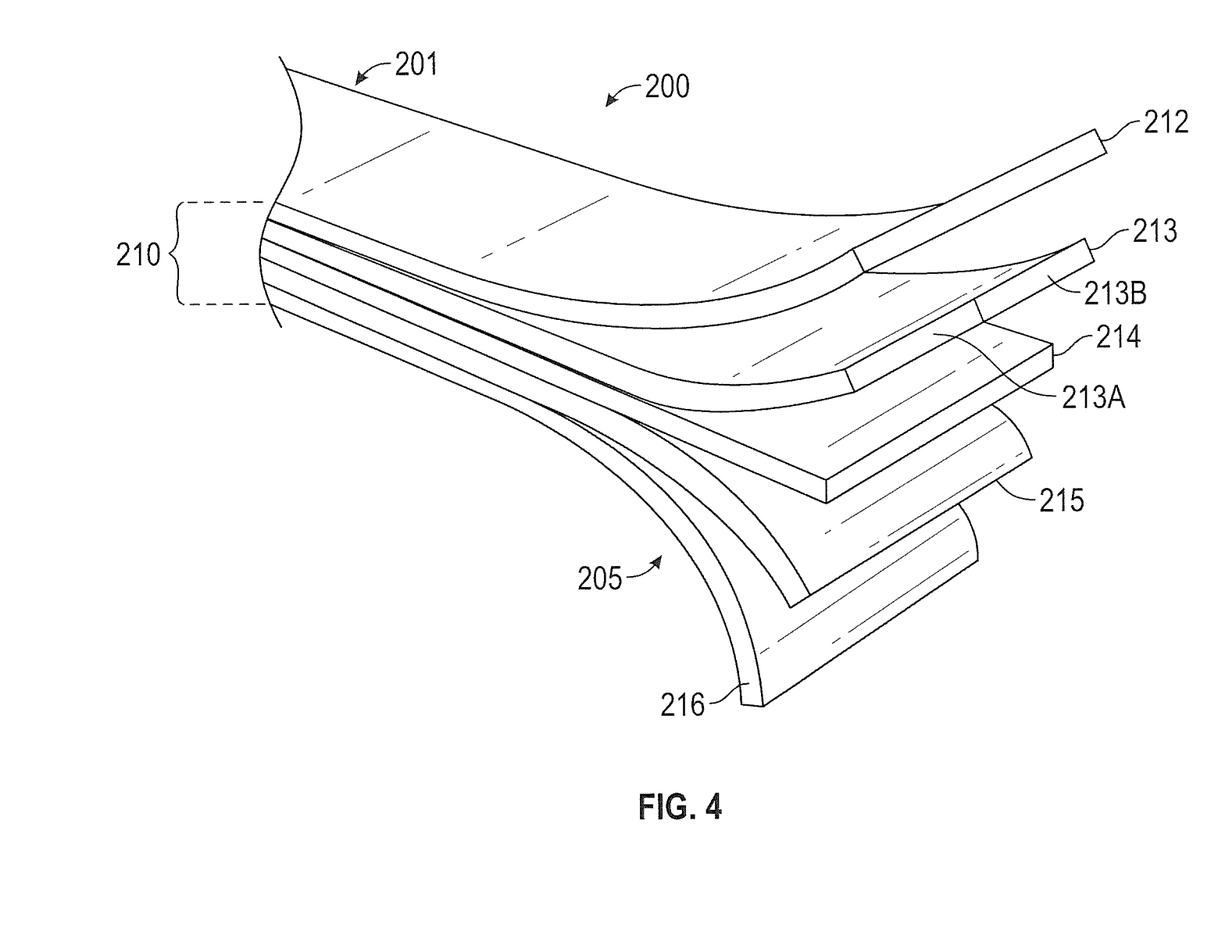
FIG. 4 is a perspective, semi-exploded view of a fiber metal laminate.

With reference to FIG. 4, an FML 200 may comprise FML layers 205 in a stack 210, comprising at least one metal layer and at least one composite material layer. In various embodiments, metal layers may alternate with composite material layers in stack 210 of FML layers 205. For example, layers 212, 214, and/or 216 may comprise metal, and layers 213 and 215 may comprise composite material. In various embodiments, the outer layers of FML 200, layers 212 and 216 in FIG. 4, may comprise metal layers. In various embodiments, the outer layers of FML 200, layers 212 and 216 in FIG. 4, may comprise composite material. In various embodiments, FML layers 205 may comprise a metal layer adjacent to another metal layer and/or a composite material layer adjacent to another composite metal layers. FML layers 205 of FML 200 may be arranged in any suitable arrangement, in addition to the arrangements described herein.

In various embodiments, one or more of FML layers 205 of FML 200 may be split, such as layer 213. Layer 213, for example, may comprise a first portion 213A and a second portion 213B. First portion 213A may comprise the same or different material than second portion 213B. For example, first portion 213A may comprise metal while second portion 213B may comprise composite material, or vice versa. Such a split configuration, such as layer 213, may be referred to as a mixed layer. A mixed layer may comprise any number of different materials. In various embodiments, the layers adjacent to a mixed layer, such as layers 212 and 214 in FIG. 4, may be an FML layer 205 comprising a single material, or may be a mixed layer. Layers 212 and 214 may both comprise a metal layer, both comprise a composite material layer, or layers 212 may comprise a metal while 214 may comprise a composite material, or vice versa.

In various embodiments, an FML may comprise one or more stacks 210 of FML layers 205 comprising any suitable arrangement of FML layers 205, for example, the arrangements described herein.

In various embodiments, a metal layer in FML 200 may comprise a metal or metal alloy. In various embodiments, a metal layer in FML 200 may comprise titanium metal and/or aluminum metal. In various embodiments, a metal layer in FML 200 may comprise any titanium alloy, such as a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium, commonly known by the industry standard designation of Titanium 6A1-4V, and hereinafter referred to as "Titanium 6A1-4V." In various embodiments, a metal layer in FML 200 may comprise any aluminum alloy, such as an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc, wherein such aluminum alloy is commonly known by the industry standard designation of Aluminum 1060, described, among other places, by ASTM International Standard B210, and hereinafter referred to as "Aluminum 1060." In various embodiments, a metal layer in FML 200 may comprise an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum, commonly known by the industry standard designation of Aluminum 7055 and hereinafter referred to as "Aluminum 7055." In various embodiments, a metal layer in FML 200 may comprise an aluminum alloy comprising, by weight, a maximum of 0.50 percent silicon, 0.50 percent iron, 0.10 percent chromium, 0.25 percent zinc, 0.15 percent titanium, and 3.8-4.9 percent copper, 0.3-0.9 percent manganese, 1.2-1.8 percent magnesium, with the remainder being aluminum, commonly known by the industry standard designation of Aluminum 2024 and hereinafter referred to as "Aluminum 2024." Aluminum 2024 may further comprise 0.15 percent by weight of other unspecified metallic elements.

In various embodiments, FML layers 205 comprising composite material may comprise any composite material such as carbon fiber, fiber-reinforced polymer (e.g., fiber glass), para-aramid fiber, and/or aramid fiber. In various embodiments, in which an FML comprises metal layers comprising titanium and/or a titanium alloy, the composite material layers in the FML may comprise carbon fiber, such as graphite fiber. The combination of a metal layer comprising titanium and a composite material layer comprising carbon fiber may occur because titanium and carbon fiber do not form a galvanic cell, and therefore, galvanic corrosion may not occur. An FML comprising titanium and/or a titanium alloy and graphite fiber is commonly known in the industry as "TiGr." In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. The combination of a metal layer comprising aluminum and a composite material layer comprising fiber glass and/or aramid fiber may occur because aluminum and fiber glass and/or aramid fiber do not form a galvanic cell, and therefore, galvanic corrosion may not occur. An FML comprising aluminum and/or an aluminum alloy and fiber glass is commonly known by the industry standard designation of "GLARE."

Though FMLs described above include specific examples of metals, metal alloys, and/or composite materials, it would not be outside the scope of this disclosure to include any FML comprising any metal, metal alloy, and/or composite material, in any arrangement of layers.

In various embodiments, FML layers 205 and/or stacks 210 of FML layers 205 may be coupled together using an adhesive material. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

Figure 5:
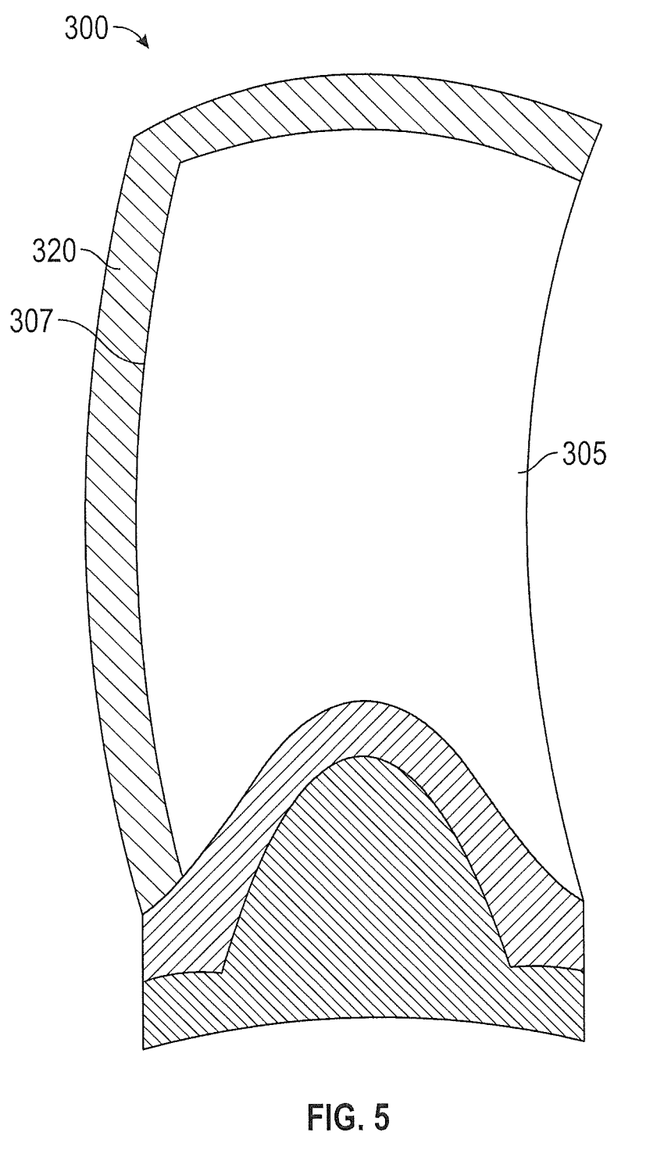
FIG. 5 is a perspective view of a structural guide vane.

Referring to FIG. 5, in various embodiments, a vane 300 may comprise a vane body 305 comprising a vane contact surface 307 and a vane edge 320. Vane edge 320 may be coupled to vane contact surface 307. In various embodiments, vane body 305 and vane edge 320 may be integral, that is, vane body 305 and vane edge 320 may comprise one continuous piece of material. In various embodiments, vane body 305 and/or vane edge 320 may comprise an FML. In various embodiments, vane body 305 may comprise the same FML as vane edge 320. When vane body 305 and vane edge 320 comprise the same FML, vane body 305 and vane edge 320 may be integral. In various embodiments, vane body 305 may comprise a different FML than vane edge 320, and the FML of vane body 305 may comprise the same configuration as, or a different configuration from, the FML of vane edge 320. Vane body 305 and/or vane edge 320 may comprise any FML, including those described herein, i.e., comprising any metal and/or metal alloy in the metal layers of the FML, and/or any composite material in the composite material layers of the FML, with the layers of the FML being in any suitable arrangement. In various embodiments, vane edge 320 may comprise an FML and vane body 305 may comprise a composite material, such as carbon fiber.

In various embodiments, in which vane body 305 is a separate piece from vane edge 320, vane body 305 may be coupled to vane edge 320 with an adhesive material. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

Because vane edge 320 and/or vane body 305 may comprise an FML, as described herein, vane edge 320 and/or vane body 305 may have the strength associated with the metal or metal alloy comprised in the FML metal layer(s). Additionally, vane edge 320 and/or vane body 305 may have the beneficial properties associated with the composite material comprised in the composite material layers of the FML. Such beneficial properties may include corrosion resistance, low density (lighter weight than metal), elasticity, and/or fatigue, which may be better than if the vane edge 320 and/or vane body 305 were comprised only of metal or a metal alloy. Therefore, a structural guide vane, being comprised of an FML may also allow greater engine efficiency because of the vane's lighter weight than a metal vane, and/or may allow greater component longevity because the vane tends not be compromised or worn from corrosion, fatigue, or other conditions as rapidly as a metal vane. Surprisingly, the vane comprised of an FML is resistant to degradation resulting from vibration. Rotational airfoils, such as fan blades, are not subjected to the same type of vibrational forces as structural guide vanes. Furthermore, the vane comprised of an FML does not require a ground plane offering further weight savings.

Figure 6A:
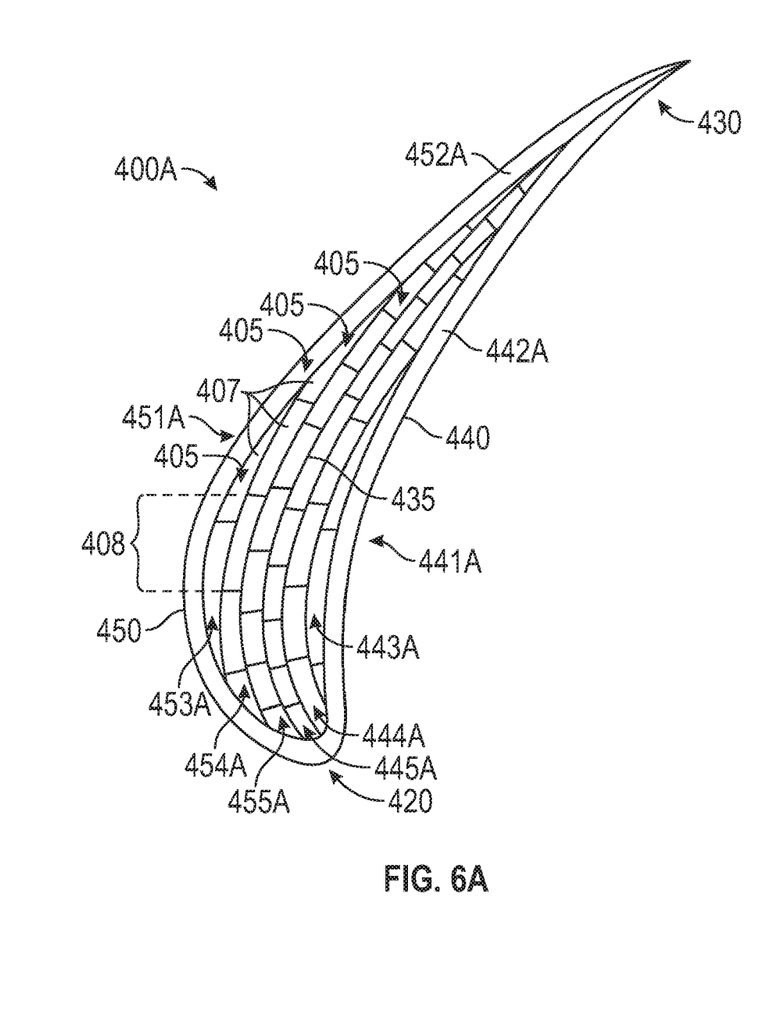
FIGS. 6A and 6B illustrate cross-sectional view of a structural guide vane.
Figure 6B:
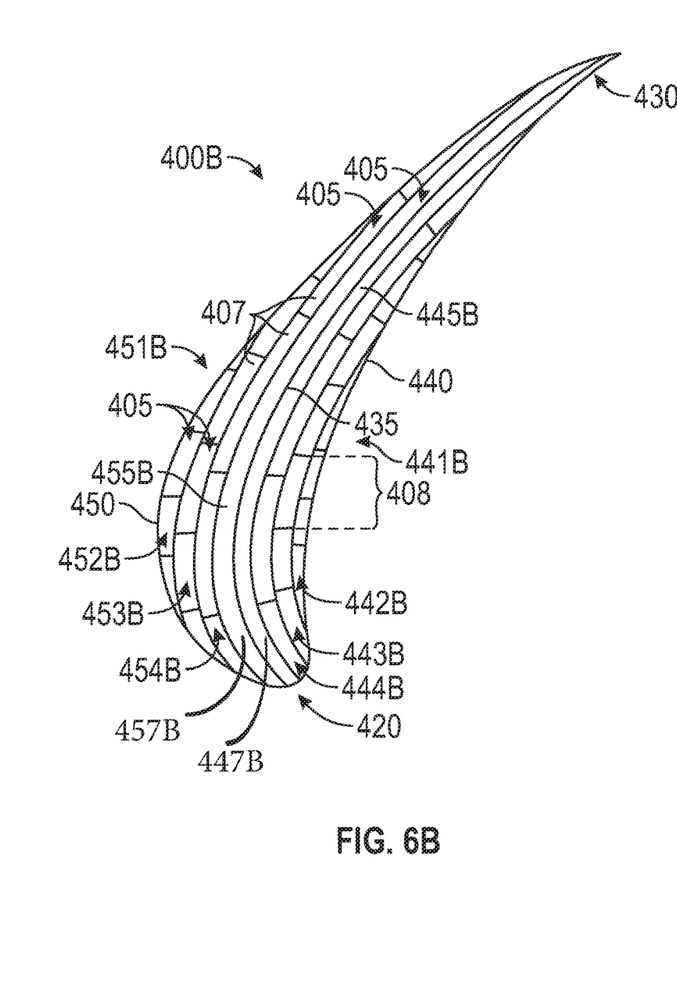

In various embodiments, FML layers 205 may be flat (i.e., disposed along one two-dimensional plane), as depicted in area 201 in FIG. 2. In various embodiments, as depicted in FIGS. 6A and 6B, layers of FML may be contoured to fit the contours of a vane 400A (or 400B). Referring further to FIGS. 6A and 6B, a vane 400A or 400B, in accordance with various embodiments, may be comprised of layers 405 spanning some length of the vane. The vane may comprise any number of layers 405. Each layer may comprise any number of plies 407. As depicted in FIGS. 6A and 6B, each layer 405 may span some length between a leading edge 420 and a trailing edge 430, with layers 405 being stacked relative to one another between a pressure side 440 and a suction side 450 of the vane. In various embodiments, each layer 405 may span between pressure side 440 and suction side 450, with layers being stacked relative to one another between leading edge 420 and trailing edge 430. Layers 405 may span in any suitable direction of the vane.

In various embodiments, with combined reference to FIGS. 5 and 6A,B, each layer 405 may comprise a stack 210 of FML layers 205, i.e., each layer 405 may comprise an FML. In various embodiments, each layer 405 may comprise a metal or metal alloy and/or a composite material, so together, layers 405 may form an FML.

Referring to FIGS. 6A and 6B, in various embodiments, vanes 400A and 400B may comprise a pressure side half 441A and 441B, respectively, between center line 435 and pressure side 440, and a suction side half 451A and 451B, respectively, between center line 435 and suction side 450. Referring to FIG. 6A, vane 400A may comprise an outer pressure side layer 442A, which may be comprised of one continuous piece of material, i.e., one ply 407, or any suitable number of plies. In various embodiments, outer pressure side layer 442A may span along the entire pressure side 440 of vane 400A. In various embodiments, outer pressure side layer 442A may span only a portion of pressure side 440. A middle pressure side layer 443A may be disposed adjacent to, and/or coupled to, outer pressure side layer 442A. Middle pressure side layer 443A may comprise a middle pressure side plurality of plies, which may have any number of plies 407. In various embodiments, vane 400A may comprise any number of middle pressure side layers between outer pressure side layer 442A and an inner pressure side layer 445A, such as middle pressure side layer 444A. In various embodiments, inner pressure side layer 445A may be the layer 405 of pressure side half 441A that is adjacent to center line 435. Inner pressure side layer 445A may comprise an inner pressure side plurality of plies, which may have more plies 407 than middle pressure side plurality of plies. In general, in various embodiments, the number of plies 407 in layers 405 may be greater in layers 405 more proximate to center line 435 than in layers 405 more proximate to pressure side 440. Accordingly, in various embodiments, middle pressure side layer 443A may have a middle pressure side plurality of plies comprising more plies 407 than outer pressure side layer 442A, and fewer plies 407 than the inner pressure side plurality of plies comprised in inner pressure side layer 445A.

In various embodiments, vane 400A may comprise an outer suction side layer 452A, which may be comprised of one continuous piece of material, i.e., one ply 407, or any suitable number of plies 407. In various embodiments, outer suction side layer 452A may span along the entire suction side 450 of vane 400A. In various embodiments, outer suction side layer 452A may span only a portion of suction side 450. A middle suction side layer 453A may be disposed adjacent to, and/or coupled to, outer suction side layer 452A. Middle suction side layer 453A may comprise a middle suction side plurality of plies 407, which may have any number of plies 407. In various embodiments, vane 400A may comprise any number of middle suction side layers between outer suction side layer 452A and an inner suction side layer 455A, such as middle suction side layer 454A. In various embodiments, inner suction side layer 457A may be the layer 405 on the suction side half 451A that is adjacent to center line 435. Inner suction side layer 455A may comprise an inner suction side plurality of plies, which may have more plies 407 than middle suction side plurality of plies. In general, in various embodiments, the number of plies 407 in layers 405 may be greater in layers 405 more proximate to center line 435 than in layers 405 more proximate to suction side 450. Accordingly, in various embodiments, middle suction side layer 453A may have a middle suction side plurality of plies comprising more plies than outer suction side layer 452A, and fewer plies than the inner suction side plurality of plies comprised in inner suction side layer 455A.

In various embodiments, plies 407 in layers 405 each may comprise a ply length 408. In various embodiments, as depicted in FIG. 6A, the ply length 408 of plies 407 may be smaller in layers 405 more proximate to center line 435 than the ply length 408 of plies 407 in layers 405 more proximate to pressure side 440 and/or suction side 450. Stated another way, in pressure side half 441A, the ply length 408 may be larger on plies 407 that are in layers 405 more proximate to pressure side 440 than the ply length 408 on plies 407 that are in layers 405 more proximate to center line 435. Similarly, in suction side half 451A, the ply length 408 may be larger on plies 407 that are in layers 405 more proximate to suction side 450 than the ply length 408 on plies 407 that are in layers 405 more proximate to center line 435. Though the ply length is discussed, in various embodiments, other dimensions of plies 407 may vary as described herein, e.g., a ply width, height, three-dimensional area, surface area, etc. That is, the width, height, three-dimensional area, surface area, etc. may be larger on plies 407 in layers 405 more proximate to pressure side 440 and/or suction side 450 than plies 407 in layers 405 more proximate to center line 435.

In various embodiments, outer pressure side layer 442A and/or outer suction side layer 452A may comprise an FML and/or a metal or metal alloy.

Referring to FIG. 6B, in various embodiments, vane 400B may comprise a pressure side half 441B. Pressure side half 441B may comprise an inner pressure side layer 447B adjacent to center line 435, which may be comprised of one continuous piece of material, i.e., one ply 407, or any suitable number of plies. In various embodiments, inner pressure side layer 447B may span along the entire center line 435. A middle pressure side layer 444B may be disposed adjacent to, and/or coupled to, inner pressure side layer 447B. Middle pressure side layer 444B may comprise a middle pressure side plurality of plies, which may have any number of plies 407. In various embodiments, the middle pressure side plurality of plies may comprise more plies than inner pressure side layer 447B. In various embodiments, vane 400B may comprise any number of middle pressure side layers between an outer pressure side layer 442B and inner pressure side layer 447B, such as middle pressure side layer 443B. In various embodiments, outer pressure side layer 442B may be the layer 405 furthest from center line 435 on pressures side half 441B. Outer pressure side layer 442B may comprise an outer pressure side plurality of plies, which may, in various embodiments, have more, the same amount, or fewer plies 407 than the middle pressure side plurality of plies. In general, in various embodiments, the number of plies 407 in layers 405 may be less in layers 405 more proximate to center line 435 than the number of plies 407 in layers 405 more proximate to pressure side 440. Accordingly, in various embodiments, middle pressure side layer 444B may have a middle pressure side plurality of plies comprising fewer plies 407 than outer pressure side layer 442B, and more plies 407 than the inner pressure side plurality of plies comprised in inner pressure side layer 447B.

Referring to FIG. 6B, in various embodiments, vane 400B may comprise a suction side half 451B. Suction side half 451B may comprise an inner suction side layer 457B adjacent to center line 435, which may be comprised of one continuous piece of material, i.e., one ply 407, or any suitable number of plies. In various embodiments, inner suction side layer 457B may span along the entire center line 435. A middle suction side layer 454B may be disposed adjacent to, and/or coupled to, inner suction side layer 457B. Middle suction side layer 454B may comprise a middle suction side plurality of plies, which may have any number of plies 407. In various embodiments, the middle suction side plurality of plies may comprise more plies than inner suction side layer 457B. In various embodiments, vane 400B may comprise any number of middle suction side layers between outer suction side layer 452B and inner suction side layer 457B, such as middle suction side layer 453B. In various embodiments, outer suction side layer 452B may be the layer 405 furthest from center line 435 on suction side half 451B. Outer suction side layer 452B may comprise an outer suction side plurality of plies, which may, in various embodiments, have more, the same amount, or fewer plies 407 than the middle suction side plurality of plies. In general, in various embodiments, the number of plies 407 in layers 405 may be less in layers 405 more proximate to center line 435 than the number of plies 407 in layers 405 more proximate to pressure side 440. Accordingly, in various embodiments, middle suction side layer 454B may have a middle suction side plurality of plies comprising fewer plies 407 than outer suction side layer 452B, and more plies 407 than the inner suction side plurality of plies comprised in inner suction side layer 457B.

In various embodiments, inner pressure side layer 447B and inner suction side layer 457B may be integral.

In various embodiments, as depicted in FIG. 6B, the ply length 408 of plies 407 may be larger in layers 405 more proximate to center line 435 than the ply length 408 of plies 407 in layers 405 more proximate to pressure side 440 and/or suction side 450. Stated another way, in pressure side half 441B, ply length 408 may be smaller on plies 407 that are more proximate to pressure side 440 than the ply length 408 on plies 407 in layers 405 that are more proximate to center line 435. Similarly, in suction side half 451B, the ply length 408 may be smaller on plies 407 that are more proximate to suction side 450 than the ply length 408 on plies 407 in layers 405 that are more proximate to center line 435. Though the ply length is discussed, in various embodiments, other dimensions of plies 407 may vary as described herein, e.g., a ply width, height, three-dimensional area, surface area, etc. That is, the width, height, three-dimensional area, surface area, etc. may be larger on plies 407 in layers 405 more proximate to center line 435 than plies 407 in layers 405 more proximate to pressure side 440 and/or suction side 450.

Figure 7A:
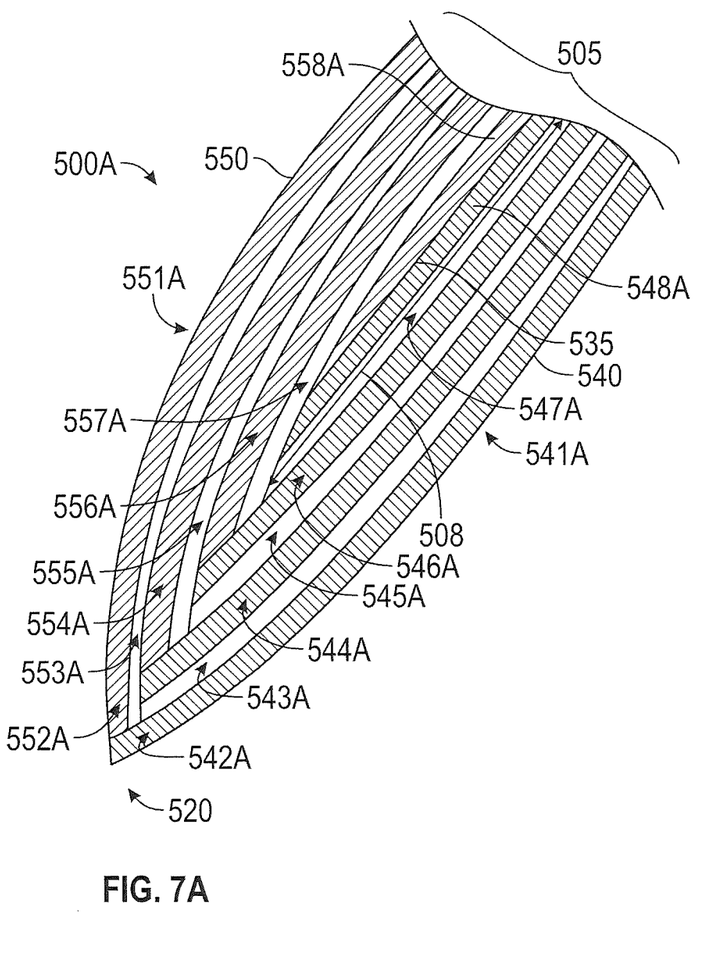
FIGS. 7A and 7B illustrate a horizontal cross-sectional view of a leading edge of a structural guide vane.
Figure 7B:
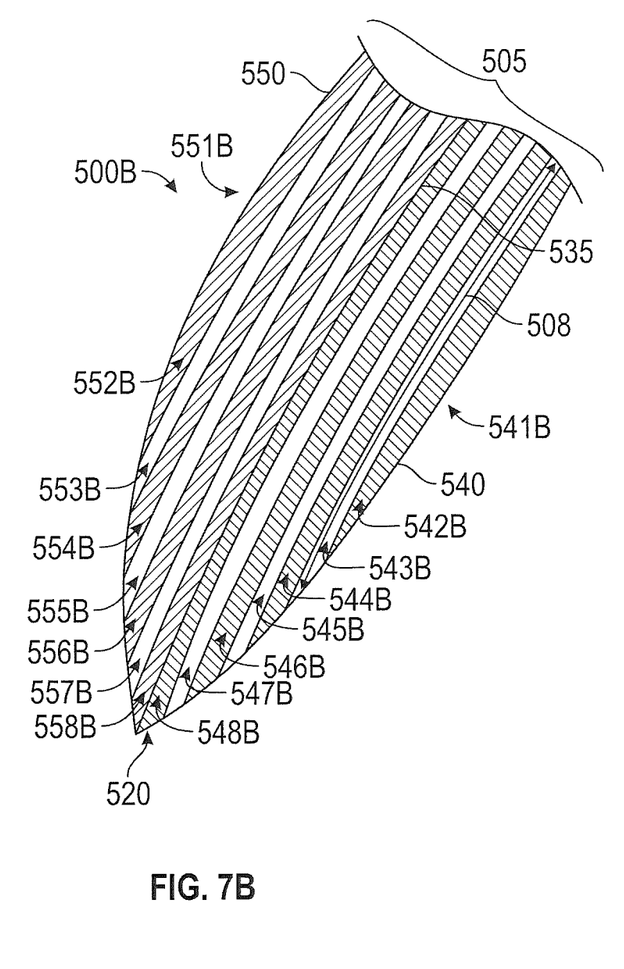

FIGS. 7A and 7B depict the leading edges 520, in accordance with various embodiments, of vanes 500A and 500B. Vanes 500A and 500B may comprise a pressure side half 541A and 541B, respectively, between center line 535 and pressure side 540, and a suction side half 551A and 551B, respectively, between center line 535 and suction side 550. Layers 505 comprised in vanes 500A and 500B each may be comprised of a single ply, unlike the exemplary embodiments in FIGS. 6A and 6B. That is, layers 505 may be one, continuous piece of a material. In various embodiments, with combined reference to FIGS. 2 and 7A and 7B, each layer 505 may comprise a stack 210 of FML layers 205, i.e., each layer 505 may comprise an FML. In various embodiments, each layer 505 may comprise a metal or metal alloy and/or a composite material, so together, layers 505 may form an FML.

Referring to FIG. 7A, vane 500A may comprise an outer pressure side layer 542A, which may be adjacent to pressure side 540. In various embodiments, outer pressure side layer 542A may span along the entire pressure side 540 of vane 500A. In various embodiments, outer pressure side layer 542A may span only a portion of pressure side 540. A middle pressure side layer 543A may be disposed adjacent to, and/or coupled to, outer pressure side layer 542A. In various embodiments, vane 500A may comprise any number of middle pressure side layers between outer pressure side layer 542A and an inner pressure side layer 548A, such as middle pressure side layers 544A, 545A, 546A, and 547A. In various embodiments, inner pressure side layer 548A may be the layer 505 of pressure side half 541A that is adjacent to center line 535.

In various embodiments, vane 500A may comprise an outer suction side layer 552A, which may be adjacent to suction side 550. In various embodiments, outer suction side layer 552A may span along the entire suction side 550 of vane 500A. In various embodiments, outer suction side layer 552A may span only a portion of suction side 550. A middle suction side layer 553A may be disposed adjacent to, and/or coupled to, outer suction side layer 552A. In various embodiments, vane 500A may comprise any number of middle suction side layers between outer suction side layer 552A and an inner suction side layer 558A, such as middle suction side layers 554A, 555A, 556A, and 557A. In various embodiments, inner suction side layer 558A may be the layer 405 on the suction side half 551A that is adjacent to center line 535.

In various embodiments, layers 505 each may comprise a length 508. In various embodiments, as depicted in FIG. 7A, the length 508 of layers 505 may be smaller in layers 505 more proximate to center line 535 than the length 508 of layers 505 more proximate to pressure side 540 and/or suction side 550. Though the length of each layer 505 is discussed, in various embodiments, other dimensions of layers 505, and/or the plies in layers 505, may vary as described herein, e.g., a width, height, three-dimensional area, surface area, etc. That is, the width, height, three-dimensional area, surface area, etc. may be larger on layers 505 more proximate to pressure side 540 and/or suction side 550 than on layers 505 more proximate to center line 535.

In various embodiments, outer pressure side layer 542A and/or outer suction side layer 552A may comprise an FML and/or a metal or metal alloy.

Referring to FIG. 7B, in various embodiments, vane 500B may comprise a pressure side half 541B. Pressure side half 541B may comprise an inner pressure side layer 548B adjacent to center line 535. In various embodiments, inner pressure side layer 548B may span along the entire center line 535. A middle pressure side layer 547B may be disposed adjacent to, and/or coupled to, inner pressure side layer 548B. In various embodiments, vane 500B may comprise any number of middle pressure side layers between an outer pressure side layer 542B and inner pressure side layer 548B, such as middle pressure side layers 543A, 544B, 545B, and 546B. In various embodiments, outer pressure side layer 542B may be the layer 405 furthest from center line 535 on pressures side half 541B.

Referring to FIG. 7B, in various embodiments, vane 500B may comprise a suction side half 551B. Suction side half 551B may comprise an inner suction side layer 558B adjacent to center line 535, which may be adjacent to suction side 550. In various embodiments, inner suction side layer 558B may span along the entire center line 535. A middle suction side layer 557B may be disposed adjacent to, and/or coupled to, inner suction side layer 558B. In various embodiments, vane 500B may comprise any number of middle suction side layers between outer suction side layer 552B and inner suction side layer 558B, such as middle suction side layers 553B, 554B, 555B 557B, and 556B. In various embodiments, outer suction side layer 552B may be the layer 505 furthest from center line 535 on suction side half 551B.

In various embodiments, layers 505 each may comprise a length 508. In various embodiments, as depicted in FIG. 7B, the length 508 of layers 505 may be smaller in layers 505 more proximate to pressure side 540 and/or suction side 550 than the length 508 of layers 505 more proximate to center line 535. Though the length of each layer 505 is discussed, in various embodiments, other dimensions of layers 505, and/or the plies in layers 505, may vary as described herein, e.g., a width, height, three-dimensional area, surface area, etc. That is, the width, height, three-dimensional area, surface area, etc. may be larger on layers 505 more proximate to pressure side 540 and/or suction side 550 than on layers 505 more proximate to center line 535.

In various embodiments, outer pressure side layer 542B and/or outer suction side layer 552B may comprise an FML and/or a metal or metal alloy.

Figure 8A:
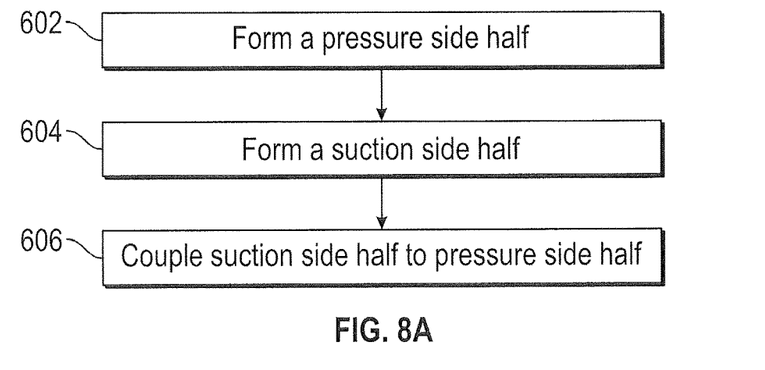
FIGS. 8A-C illustrate block diagrams of a method of manufacturing a structural guide vane.
Figure 8B:
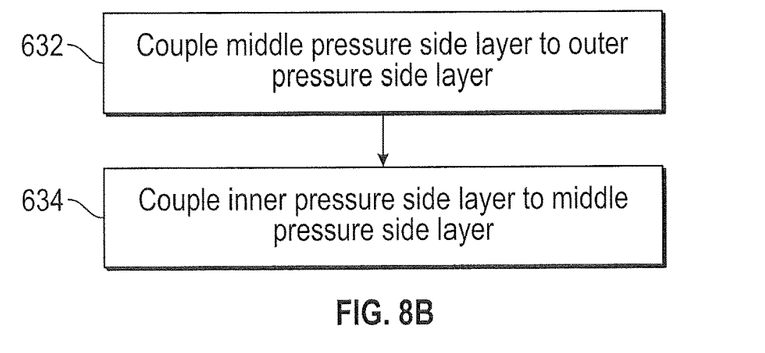
Figure 8C:
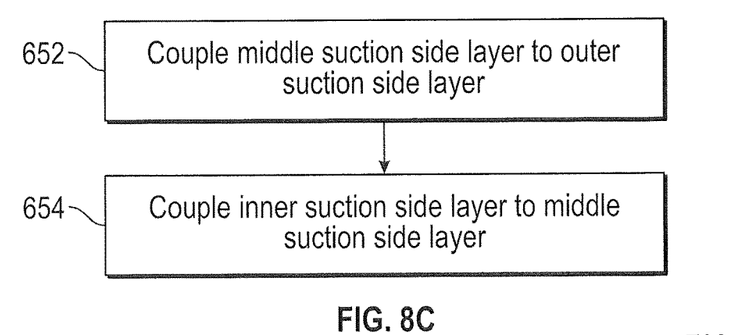

FIGS. 8A-C depict a method for forming a vane, in accordance with various embodiments. With reference to FIGS. 8A and 7A,B, a pressure side half 541A (or 541B) may be formed (step 602), a suction side half 551A (or 551B) may be formed (step 604), and pressure side half 541A and suction side half 551A may be coupled (step 606) to form a vane. In various embodiments, the pressure side half and/or the suction side half may comprise an FML. In various embodiments, pressure side half 541A and suction side half 551A may be coupled together by coupling inner pressure side layer 548A to inner suction side layer 558A.

With reference to FIG. 8B, a method for forming a pressure side half of a vane is depicted, in accordance with various embodiments. In various embodiments, with reference to FIGS. 7A and 6B, pressure side half 541A may be formed by providing an outer pressure side layer 542A, and coupling a middle pressure side layer 543A to outer pressure side layer 542A (step 632). With momentary reference to FIGS. 6A and 6B, in various embodiments, layers comprised in pressure side half 441A may comprise any number of plies 407. The plies 407 in middle pressure side layer 443A may be coupled to outer pressure side layer 442A, which may comprise a solid piece of material (i.e., one ply), simultaneously, one at a time, or any number at a time. Returning to FIGS. 7A and 6B, an inner pressure side layer 548A may be coupled to the middle pressure side layer (step 634) in a similar fashion to middle pressure side layer 543A being coupled to outer pressure side layer 542A. In various embodiments, there may be any number of additional middle pressure side layers, such as middle pressure side layers 543A, 544A, 546A, and 547A, disposed and/or coupled between outer pressure side layer 542A and inner pressure side layer 548A.

In various embodiments, with reference to FIGS. 7A and 8C, suction side half 551A may be formed by providing an outer suction side layer 552A, and coupling a middle suction side layer 553A to outer suction side layer 552A (step 652). With momentary reference to FIGS. 6A and 6B, in various embodiments, layers 405 comprised in suction side half 451A may comprise any number of plies 407. The plies 407 in middle suction side layer 453A may be coupled to outer suction side layer 452A, which may comprise a solid piece of material (i.e., one ply), simultaneously, or one at a time, or any number at a time. Returning to FIGS. 7A and 8C, an inner suction side layer 558A may be coupled to the middle suction side layer (step 654) in a similar fashion to middle suction side layer 553A being coupled to outer suction side layer 552A. In various embodiments, there may be any number of additional middle suction side layers, such as middle suction side layers 554A, 555A, 556A, and 557A, disposed and/or coupled between outer suction side layer 452A and inner suction side layer 558A. The layers, and/or plies, in vane 500A may vary in length as described herein.

In various embodiments, pressure side half 541A and suction side half 551A may be coupled after pressure side half 541A and suction side half 551A have been formed.

In various embodiments, with reference to FIGS. 7B, 8B, and 8C, a pressure side half 541B may be formed by coupling a middle pressure side layer 547B to an inner pressure side layer 548B (step 634), and coupling an outer pressure side layer 542B to the middle pressure side layer (step 632). In various embodiments, there may be any number of middle pressure side layers between inner pressure side layer 548B and outer pressure side layer 542B. Similarly, a suction side half 551B may be formed by coupling a middle suction side layer 557B to an inner suction side layer 558B (step 654), and coupling an outer suction side layer 452B to the middle suction side layer (step 652). In various embodiments, there may be any number of middle suction side layers between inner suction side layer 558B and outer suction side layer 452B. In various embodiments, the inner pressure side layer 548B and the inner suction side layer 558B may be integral. The layers, and/or plies, in vane 500B may vary in length as described herein.

Figure 9:
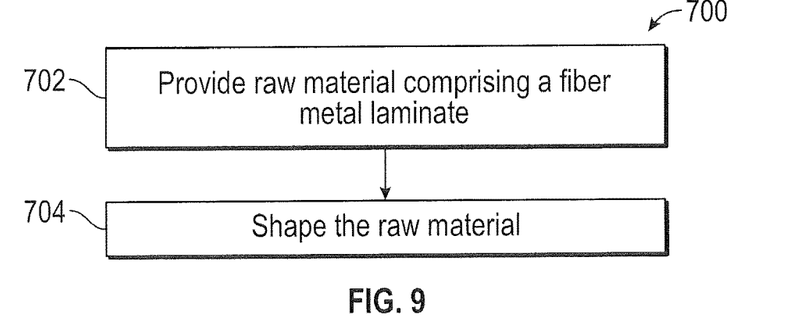
FIG. 9 illustrates a block diagram of a method of manufacturing a structural guide vane using machining.

In various embodiments, with reference to the method 700 depicted in FIG. 9, in various embodiments, a vane may be formed by providing raw material comprising an FML (step 702), and shaping the raw material (step 704) into the shape of a vane. The raw material may be comprised of an FML comprising any metal and/or composite material, with layers arranged in any suitable configuration, as described herein. In various embodiments, the layers in the FML, or the layers of FML, may be flat (i.e., disposed along one two-dimensional plane), for example, as depicted in area 201 in FIG. 4, and the contours of a vane may be achieved by the shaping of the raw material. The raw material provided may be in a block form that comprises any suitable shape, and may be shaped using milling, grinding, turning, drilling, and/or any other suitable method of machining.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A structural guide vane comprising a suction side with an outer suction side layer comprising a fiber metal laminate on one side of a center line and a pressure side having an outer pressure side layer comprising a fiber metal laminate on the other side of the center line, wherein the outer suction side layer spans only a portion of the suction side and the outer pressure side layer spans only a portion of the pressure side, no layers of the suction side or the pressure side cross the center line, and the fiber metal laminates comprise layers of composite material among layers of metal.

2. The structural guide vane of claim 1, wherein the fiber metal laminates comprises a metal layer comprising at least one of titanium or a titanium alloy.

3. The structural guide vane of claim 2, wherein the titanium alloy comprises, by weight, 5.5-6.75 aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium.

4. The structural guide vane of claim 2, wherein the fiber metal laminate comprises a carbon fiber layer.

5. The structural guide vane of claim 1, wherein the fiber metal laminates comprises a metal layer comprising at least one of aluminum or an aluminum alloy.

6. The structural guide vane of claim 5, wherein the aluminum alloy comprises, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc.

7. The structural guide vane of claim 5, wherein the aluminum alloy comprises, a maximum of 0.50 percent silicon, 0.50 percent iron, 0.10 percent chromium, 0.25 percent zinc, 0.15 percent titanium, and 3.8-4.9 percent copper, 0.3-0.9 percent manganese, 1.2-1.8 percent magnesium, with the remainder being aluminum.

8. The structural guide vane of claim 5, wherein the fiber metal laminate comprises a fiber-reinforced polymer layer.

9. The structural guide vane of claim 5, wherein the fiber metal laminate comprises at least one of an aramid fiber or a para-aramid fiber.

10. A method for forming structural guide vane of a gas turbine engine, comprising: forming a pressure side half of the structural guide vane, wherein the pressure side half comprises a fiber metal laminate having an inner layer which has a shorter length than an outer layer; forming a suction side half of the structural guide vane, wherein the suction side half comprises the fiber metal laminate having an inner layer having a shorter length than an outer layer; and coupling the pressure side half to the suction side half.

11. The method of claim 10, wherein the forming the pressure side half comprises: coupling a middle pressure side layer to an outer pressure side layer having an outer pressure side length, the middle pressure side layer comprising a middle pressure side length; and coupling an inner pressure side layer to the middle pressure side layer, the inner pressure side layer comprising an inner pressure side length, wherein the outer pressure side length is larger than the middle pressure side length and the middle pressure side length is larger than the inner pressure side length.

12. The method of claim 10, wherein the forming the suction side half comprises: coupling a middle suction side layer to an outer suction side layer having an outer suction side length, the middle suction side layer comprising a middle suction side length; and coupling an inner suction side layer to the middle suction side layer, the inner suction side layer comprising an inner suction side length, wherein the outer suction side length is larger than the middle suction side length and the middle suction side length is larger than the inner suction side length.

13. The method of claim 11, wherein at least one of the outer pressure side layer, the middle pressure side layer, or the inner pressure side layer comprises at least one of titanium or a titanium alloy.

14. A structural guide vane comprising a center line, middle suction side layers disposed between an outer suction side layer and an inner suction side layer and middle pressure side layers disposed between an outer pressure side layer and an inner pressure side layer wherein the middle suction side layers and the middle pressure side layers comprise plies of fiber metal laminate, the inner suction layer and the inner pressure layer are disposed on opposite sides of the center line, and no suction side layers or pressure side layers cross the center line.

15. The structural guide vane of claim 14, wherein the fiber metal laminates comprises a metal layer comprising at least one of titanium or a titanium alloy.

16. The structural guide vane of claim 15, wherein the titanium alloy comprises, by weight, 5.5-6.75 aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium.

17. The structural guide vane of claim 15, wherein the fiber metal laminate comprises a carbon fiber layer.

18. The structural guide vane of claim 14, wherein the fiber metal laminates comprises a metal layer comprising at least one of aluminum or an aluminum alloy and a fiber reinforced polymer layer and the fiber reinforced polymer layer comprises at least one of an aramid fiber or a para-aramid fiber.

19. The structural guide vane of claim 18, wherein the aluminum alloy comprises, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc.

20. The structural guide vane of claim 18, wherein the aluminum alloy comprises, a maximum of 0.50 percent silicon, 0.50 percent iron, 0.10 percent chromium, 0.25 percent zinc, 0.15 percent titanium, and 3.8-4.9 percent copper, 0.3-0.9 percent manganese, 1.2-1.8 percent magnesium, with the remainder being aluminum.

* * * * *